June 20, 1961 W. L. WHITE 2,988,800
METHODS OF PRODUCING FABRICS HAVING DEPRESSED SURFACE AREAS
Filed Jan. 30, 1958 6 Sheets-Sheet 1

INVENTOR.
William L. White,
BY Paul & Paul
ATTORNEYS.

June 20, 1961 W. L. WHITE 2,988,800
METHODS OF PRODUCING FABRICS HAVING DEPRESSED SURFACE AREAS
Filed Jan. 30, 1958 6 Sheets-Sheet 2

INVENTOR.
William L. White,
BY
Paul & Paul
ATTORNEYS.

June 20, 1961 W. L. WHITE 2,988,800
METHODS OF PRODUCING FABRICS HAVING DEPRESSED SURFACE AREAS
Filed Jan. 30, 1958 6 Sheets-Sheet 3
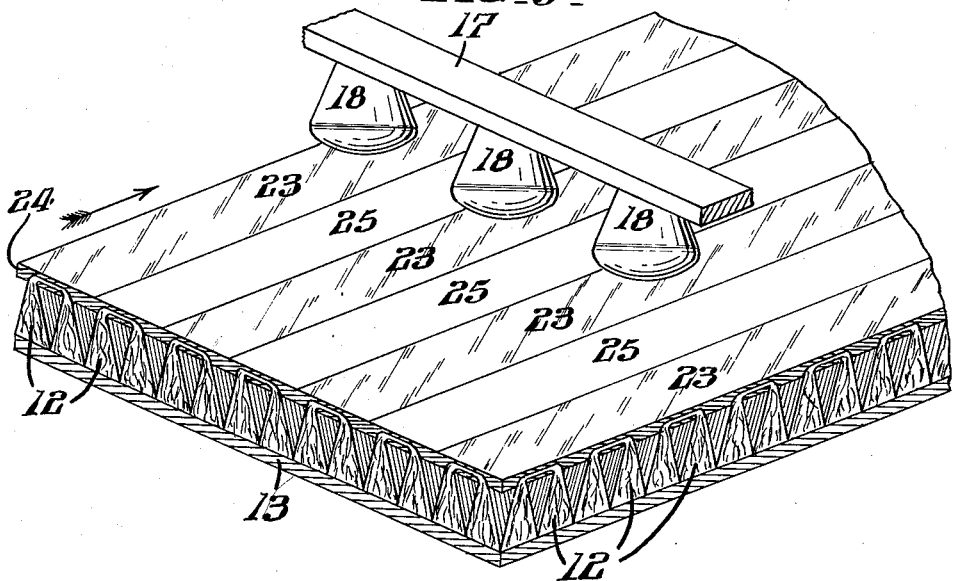
FIG_5_
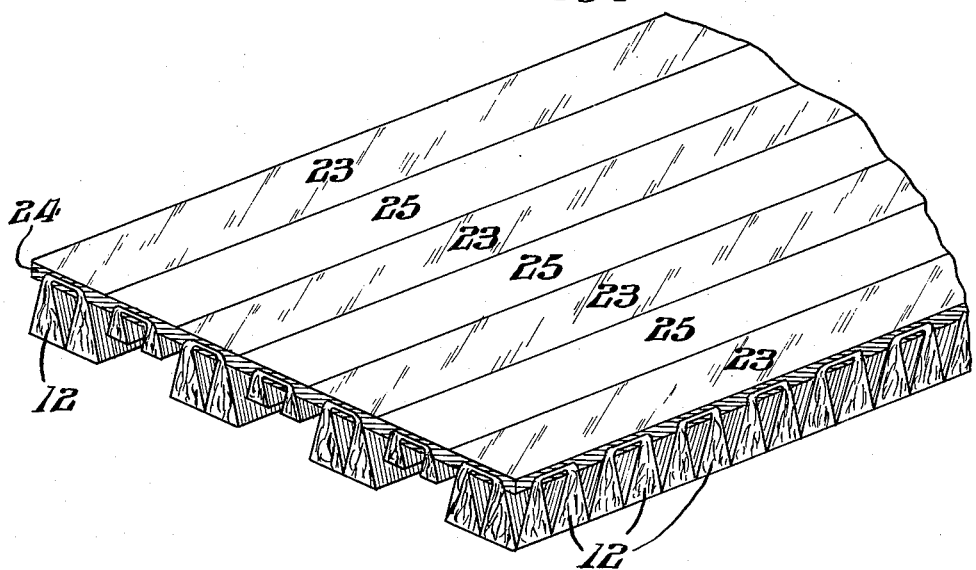
FIG_6_
INVENTOR.
William L. White,
BY Paul & Paul
ATTORNEYS.

INVENTOR.
William L. White,
BY Paul & Paul
ATTORNEYS.

June 20, 1961   W. L. WHITE   2,988,800
METHODS OF PRODUCING FABRICS HAVING DEPRESSED SURFACE AREAS
Filed Jan. 30, 1958   6 Sheets-Sheet 5
FIG_9_
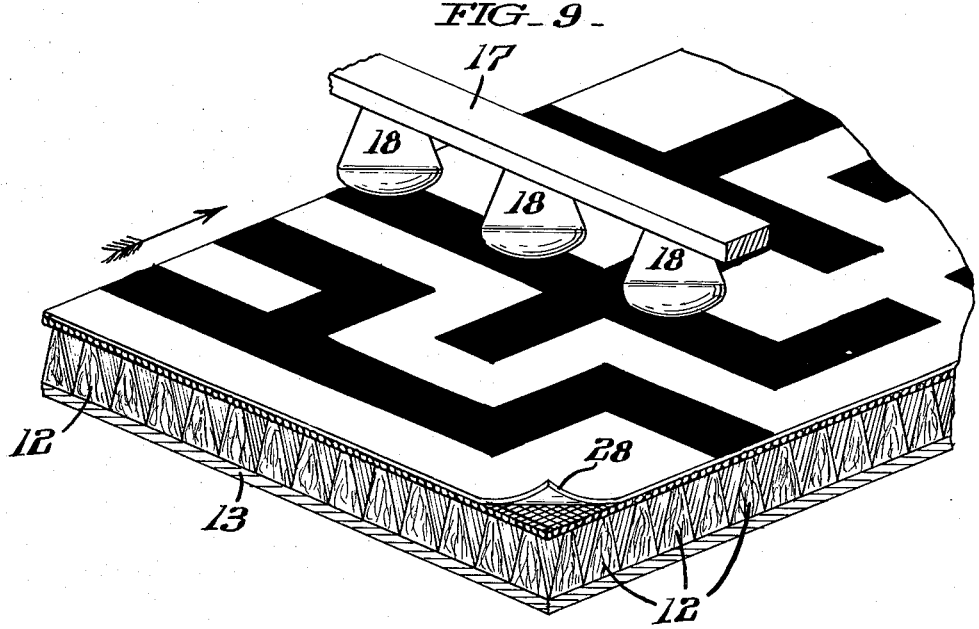
FIG_10_
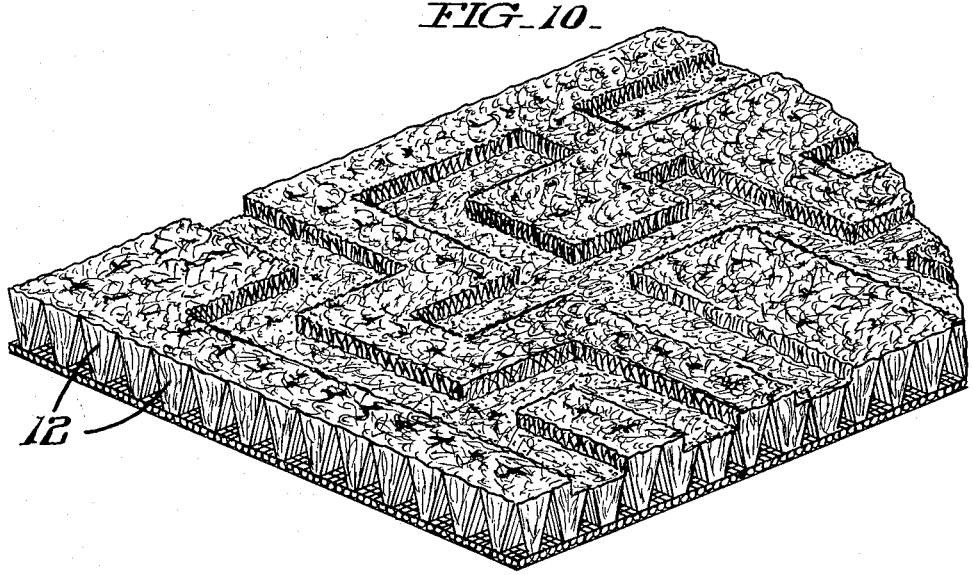
INVENTOR.
William L. White,
BY Paul & Paul
ATTORNEYS.

June 20, 1961  W. L. WHITE  2,988,800
METHODS OF PRODUCING FABRICS HAVING DEPRESSED SURFACE AREAS
Filed Jan. 30, 1958  6 Sheets-Sheet 6
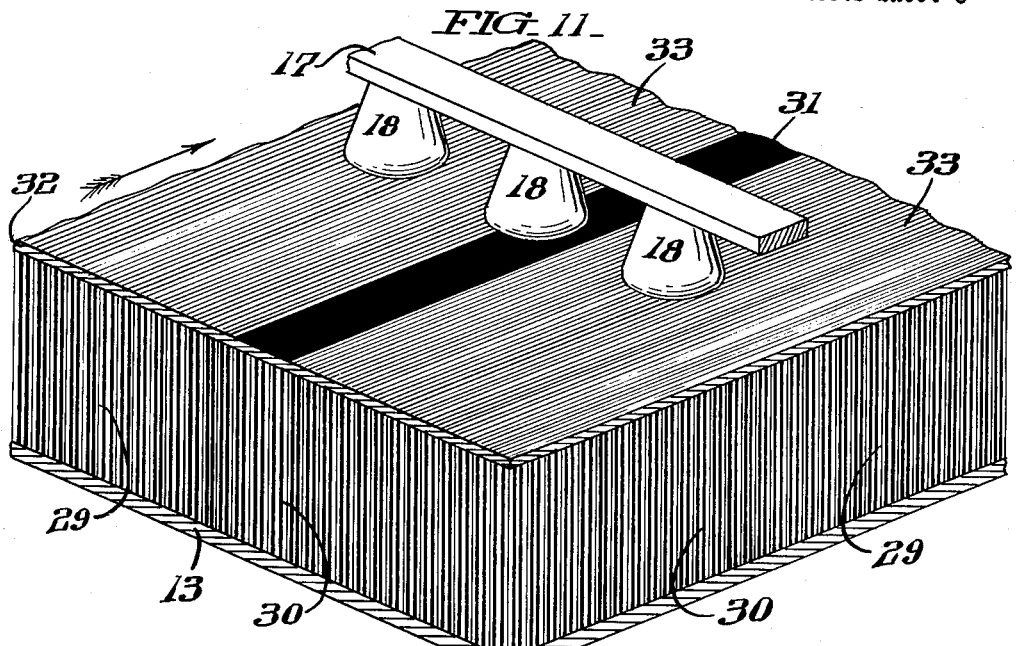
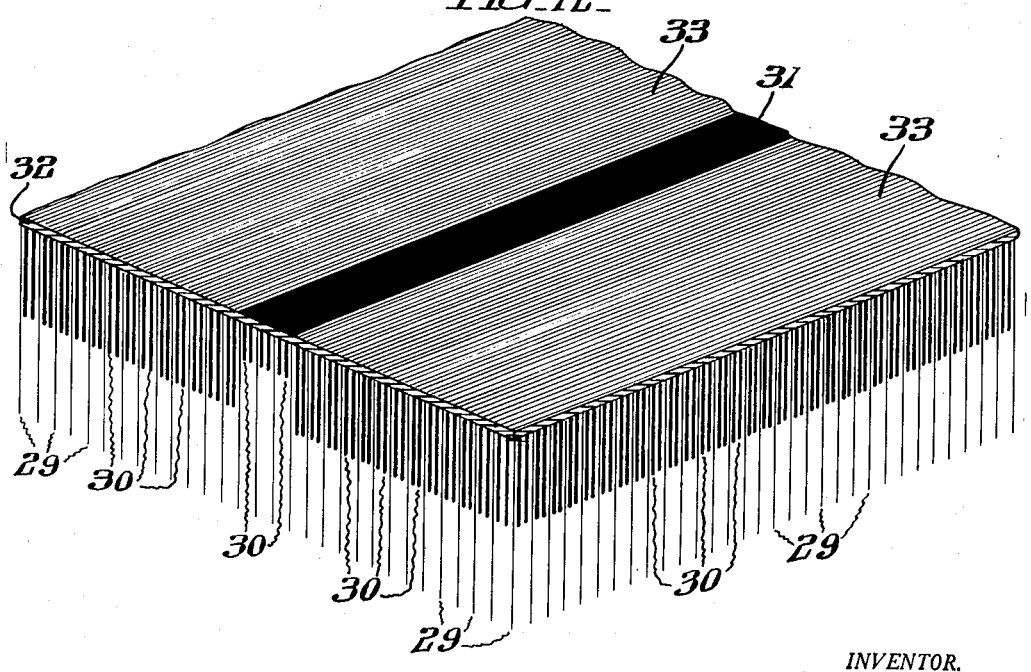
INVENTOR.
William L. White,
BY Paul & Paul
ATTORNEYS.

United States Patent Office 2,988,800
Patented June 20, 1961

2,988,800
METHODS OF PRODUCING FABRICS HAVING DEPRESSED SURFACE AREAS
William L. White, Wynnewood, Pa., assignor to Collins & Aikman Corporation, New York, N.Y., a corporation of Delaware
Filed Jan. 30, 1958, Ser. No. 712,111
13 Claims. (Cl. 28—72)

This invention relates to fabrics having predetermined surface areas which are depressed relative to other surface areas of the fabric.

Various attempts have been made to produce fabrics having surface effects in which portions are depressed relative to other portions. For example, upholstery and carpet material of the "carved" type have been woven to give such an effect. It is a characteristic of such fabrics that certain portions of the surface thereof are depressed relative to other surface portions. One method of producing this effect is disclosed in my co-pending application, Serial No. 658,740, filed May 13, 1957, and now Patent No. 2,875,504, dated March 3, 1959, whereby a surface effect may be produced by heating a fabric, portions of which are composed of shrinkable fibers and portions of which are composed of non-shrinkable fibers, the portions composed of shrinkable fibers becoming depressed relative to the portions composed of non-shrinkable fibers on application of heat in a suitable amount.

It is an object of this invention to produce fabrics having a surface effect characterized by portions thereof being depressed relative to other surface portions wherein the fabric need not be formed of portions having different shrinkage characteristics. Another object is to produce fabrics having depressed surface portions by a method which permits employment of a uniformity of weave but produces a non-uniformity of depressed portions. Another object is to produce such fabrics in a manner by which the resulting effect will be that of pieced-together natural furs.

I have discovered that the above mentioned objects may be achieved by treating the back of a fabric composed throughout at least in part of shrinkable fibers so as to vary the specific heat absorptivity of portions of the back, and then subjecting the fabric from the back to a source of heat for a sufficient length of time to achieve a surface effect in which portions of the surface of the fabric are depressed more than other portions.

This invention may be understood by reference to the following description and drawings, the reference characters thereof referring to like characters used throughout the description, and in the drawings, whereof:

FIG. 5 is an enlarged perspective view of a modification of this invention wherein the back of the fabric has been partially coated with a heat reflective material.

FIG. 6 shows the fabric of FIG. 5 after it has received heat treatment.

FIG. 9 is an enlarged perspective view of a modification of this invention wherein there has been applied to the back of the fabric a pattern sheet.

FIG. 10 shows the modification of FIG. 9 subsequent to heat treatment.

FIG. 11 is an enlarged perspective view of a modification of this invention wherein the fabric is composed of shrinkable and non-shrinkable yarns.

FIG. 12 shows the fabric of FIG. 11 after it has received heat treatment.

Figure 1:
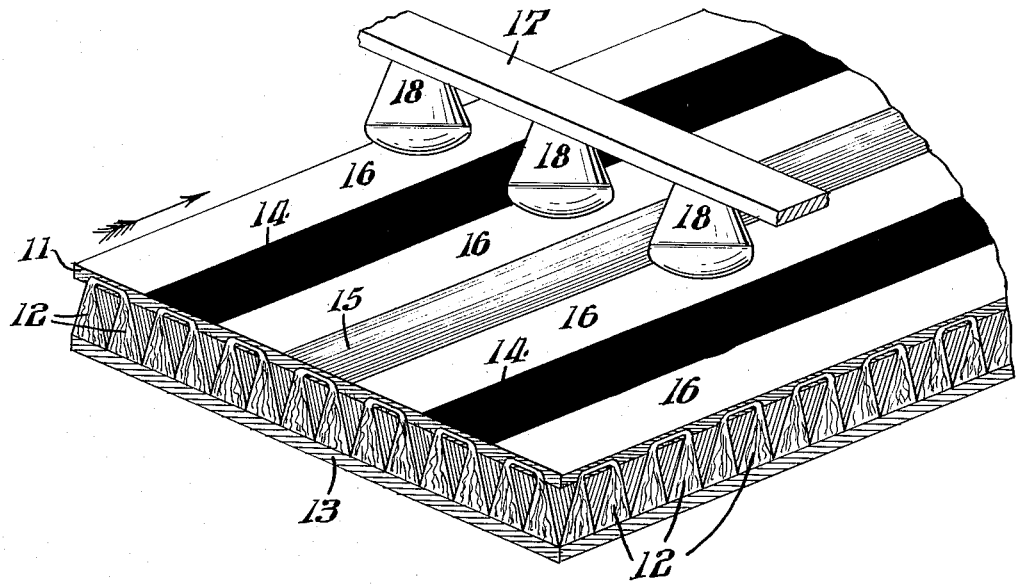
FIG. 1 is an enlarged perspective view of a fabric prepared in accordance with one modification of this invention as it appears prior to heat treatment.

Referring now to FIG. 1, a fabric composed of base 11 and shrinkable yarn pile tufts 12 is positioned face down on support 13. Base 11 has been treated in portions 14 and 15 in such a manner that the relative specific heat absorptivity of these portions is greater than that of untreated portions 16. Such treatment can be achieved in various ways. One method of treating is to color portions 14 and 15 to various degrees of darkness, the darker color causing the corresponding portion of the base to have a higher specific heat absorption constant than the lightly colored portion. Likewise, the specific heat absorptivity may be varied by treating the portions 14, 15 with different amounts of metal salts or the like, the portion having the higher metal salt concentration being able to absorb heat more readily.

Figure 2:
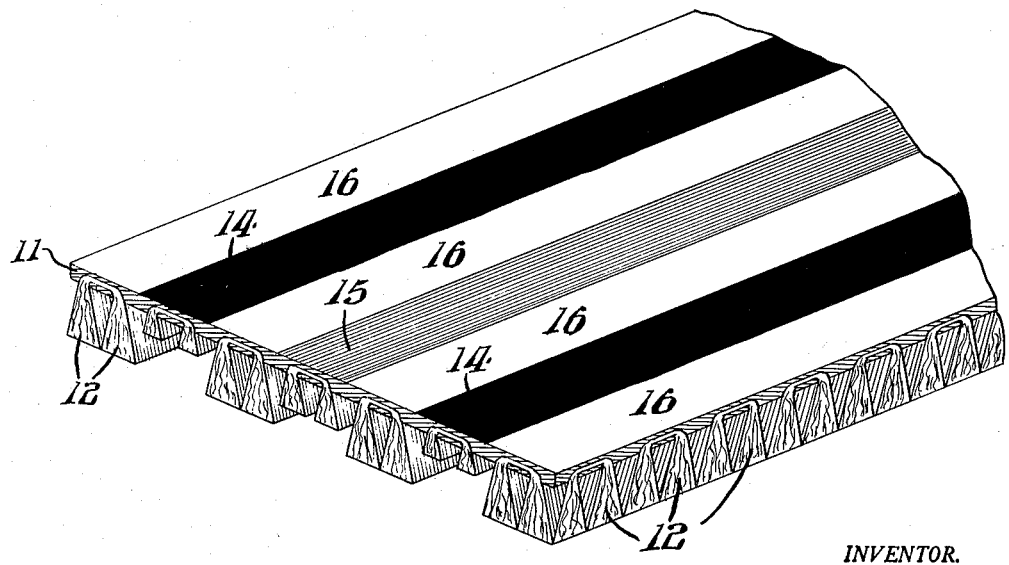
FIG. 2 shows the fabric of FIG. 1 after it has received heat treatment.

Subsequent to the above treatment of portions 14 and 15, the back of the fabric of FIG. 1 is exposed in accordance with this invention to the heat radiations of the bank 17 of infra-light lamps 18. FIG. 2 shows the fabric of FIG. 1 after this heat treatment. The shrinkable yarn pile tufts under portions 14, 15 and 16 have shrunk to varying lengths depending on the specific heat absorptivity of the corresponding portion of the back of base 11. The pile under portion 14 has shrunk to the greatest extent since the specific heat absorptivity of portion 14 is greater than that of portions 15 and 16. In like manner untreated portion 16 has shrunk least of all and portion 15 has shrunk an intermediate amount.

Figure 3:
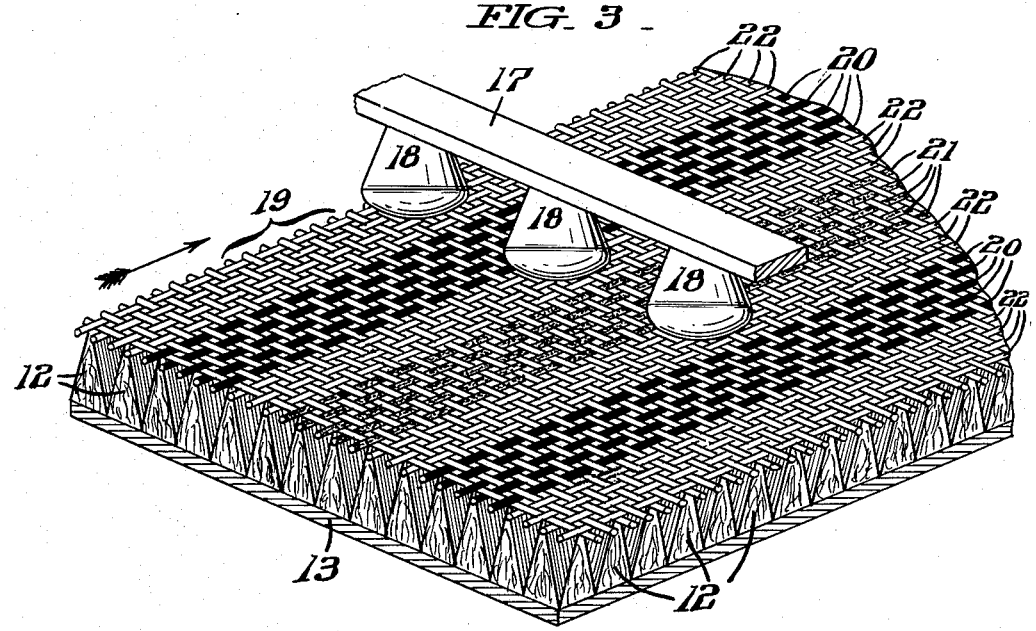
FIG. 3 is an enlarged perspective view of a modification of this invention.
Figure 4:
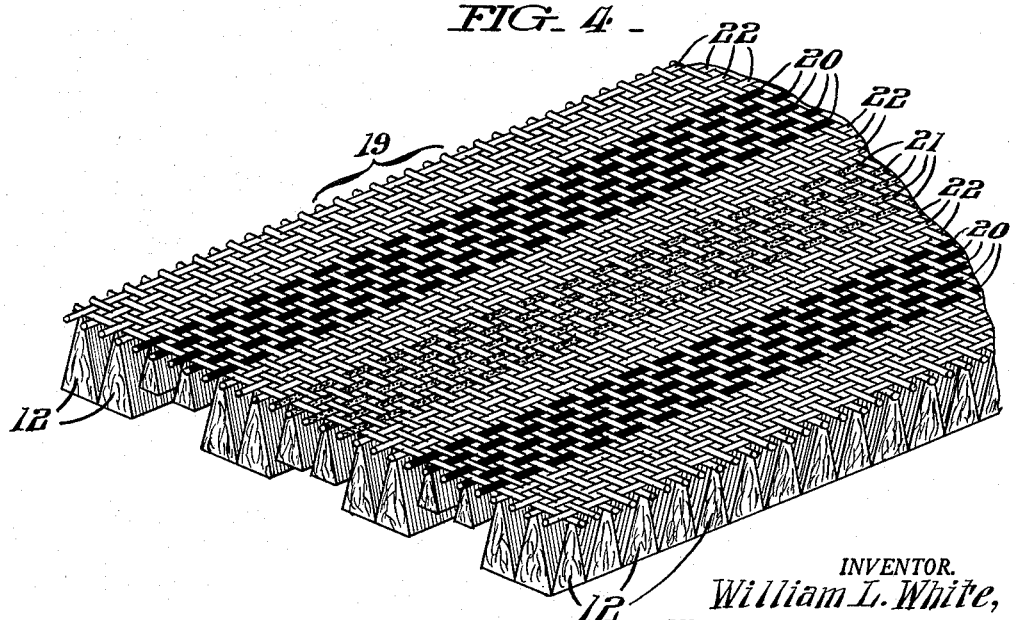
FIG. 4 shows the fabric of FIG. 3 after it has received heat treatment.

FIG. 3 shows one modification of this invention wherein a fabric is composed of base 19 and shrinkable yarn pile tufts 12. Portions of base 19 are treated in accordance with this invention by weaving the base from dissimilar threads 20, 21, 22. Thread 20 has been treated similarly to portion 14 of base 11 of FIG. 1 whereas thread 21 has been treated similarly to portion 15. Thread 22 has not been treated in any way to change its specific heat absorptivity. By thus treating woven base 19, portions thereof are given varying degrees of specific heat absorptivity. A subsequent exposure to the lamps 18 produces the effect shown in FIG. 14, the shrinkable yarn pile tufts having shrunk varying amounts as in the modification shown by FIG. 2.

In like manner, FIG. 5 represents a further modification of this invention wherein portions 23 of base 24 have been treated with a heat-reflective coating, and portions 25 have not been treated. Thus, as shown in FIG. 6, the effect achieved by this invention is obtained by subjecting the back of the fabric of FIG. 5 to heat from lamps 18.

Figure 7:
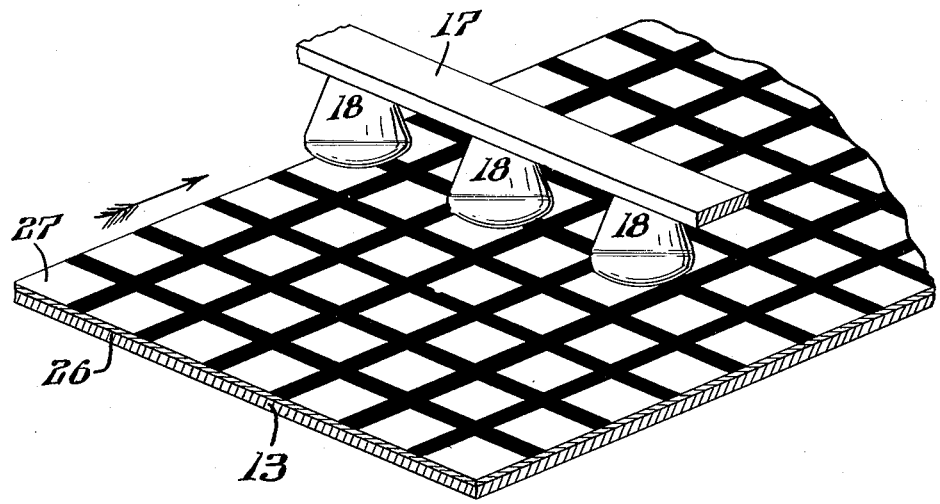
FIG. 7 is an enlarged perspective view of a modification of this invention wherein the back of a flat fabric has had a pattern printed upon it.
Figure 8:
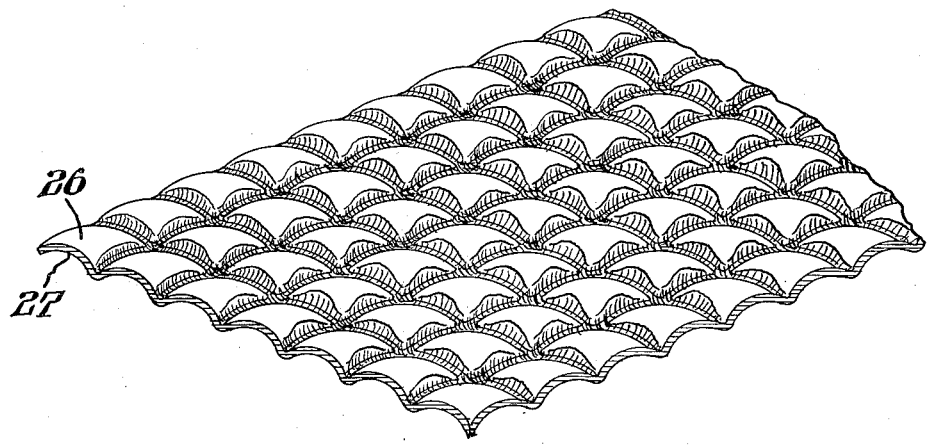
FIG. 8 shows the fabric of FIG. 7 after it has received heat treatment.

In FIG. 7 a variation of this invention is shown. A flat fabric composed of shrinkable fibers and consisting of a front portion 26 and a back portion 27 has been treated in accordance with the method of this invention by printing a colored pattern onto the back portion 27. By exposure to the heat emanating from lamps 18 a puckered or plisse effect as shown in FIG. 8 is achieved.

A still further modification of this invention is shown in FIG. 9. Here a pattern sheet 28, treated in accordance with this invention, has been placed in contact with the back of a fabric composed as heretofore described. The pattern sheet having been treated so as to contain areas of varying specific heat absorptivity, the effect shown in FIG. 10 is achieved by subjecting the back of the fabric of FIG. 9 to the heat of lamps 18 through pattern sheet 28.

By proceeding in accordance with the above described method, it is possible to produce a fabric having an appearance simulating that of natural furs which have been pieced together. For example, FIG. 11 represents a fabric composed of shrinkable and non-shrinkable fibers. Fibers 29 are made of non-shrinkable material and simulate the beard hair of natural fur. Yarns 30 are made of shrinkable fibers such as dynel. Portion 31 of base 32 of the fabric of FIG. 11 has been treated in accordance with this invention so as to have a high constant of specific heat absorptivity. Portions 33 have either been treated so as to have a relatively low constant of specific heat absorptivity or have been left untreated. Upon exposure of the fabric so treated to the heat from lamps 18 from the back of base 32, the effect shown in FIG. 12 is produced. In FIG. 12 the fibers 29 form a face surface level simulating the beard hairs of natural fur while the shrinkable fibers 30 underneath portions 33 of base 32 have shrunk so as to simulate the furry underpelt of natural fur. Because of the higher specific heat absorptivity of portion 31 over portion 33, the fibers 30 under portion 31 have shrunk to a greater degree than fibers 30 under portion 33. This effect simulates the effect exhibited at the seam of natural furs which have been pieced together.

Other modifications of the principle of this invention are readily apparent. For example, the base foundation web of a woven fabric may be treated in accordance with this invention by omitting certain warp threads during the weaving operation. This would obviously result in an increased specific heat absorptivity factor where the warp threads have been omitted.

Soures of heat other than the infra-light lamps herein disclosed are also suitable for performing the method of this invention such as, for example, heated contact elements and convection currents.

In addition to the fur-effect described above, other textured fabric effects may readily be achieved in accordance with this invention such as ornamental loop pile and ornamented cut pile fabrics. Other forms of textured flat fabrics can likewise be produced. The infra-light lamps referred to herein can be any of the usual infra-light types, such as, for example, infra-red lamps.

Having thus described my invention, I claim:

1. In a method of producing woven textile fabric having a base or foundation web and a pile formed uniformly throughout from shrinkable and non-shrinkable yarns wherein the fabric is subjected to the influence of heat from the back to cause linear contraction of pile formed from the shrinkable yarns without substantially affecting the base or the foundation web or the pile formed from the non-shrinkable yarns, the step of pretreating portions of said foundation web by coloring the back thereof so as to change the specific heat absorptivity of said portions, whereby the linear contraction of shrinkable pile yarns is greatest adjacent those portions of the foundation web having the highest specific heat absorptivity.

2. In a method of producing woven textile fabric having a base or foundation web and a pile formed from shrinkable pile yarns wherein the fabric is subjected to the influence of heat from the back to cause linear contraction of the pile yarns without substantially affecting the base or foundation web, the improvement which comprises the step of pretreating portions of said foundation web by coloring the back thereof so as to change the specific heat absorptivity of said portions, whereby the linear contraction of the pile yarns is greatest adjacent those portions of the foundation web having the highest specific heat absorptivity.

3. The method according to claim 2 in which the heat is applied by contacting the back of the fabric with a heated surface.

4. The method according to claim 2 in which the heat is applied to the fabric by subjecting the fabric from the back to the influence of infra-light rays.

5. The method according to claim 2 in which the heat is applied by subjecting the fabric from the back to the influence of convection currents.

6. The method according to claim 1 in which the heat is applied by contacting the back of the fabric with a heated surface.

7. The method according to claim 1 in which the heat is applied to the fabric by subjecting the fabric from the back to the influence of infra-light rays.

8. The method according to claim 1 in which the heat is applied by subjecting the fabric from the back to the influence of convention currents.

9. The method of claim 1 in which the back of the foundation web is colored by weaving said web from yarns of a plurality of distinct colors.

10. Imitation pieced natural animal fur comprising a woven textile fabric having a base or foundation web and a pile formed from shrinkable and non-shrinkable yarns, said shrinkable yarns being shrunk, whereby said non-shrinkable yarns constitute a face surface simulating beard hairs of natural fur and said shrunken yarns constitute a face surface simulating the under pelt of natural fur, certain of said shrinkable yarns in areas corresponding to the seams of pieced natural fur being shrunk below the face surface of said simulated under pelt.

11. The method of claim 1 in which the back of the foundation web is colored by printing a colored pattern thereon.

12. The method of claim 2 in which the back of the foundation web is colored by weaving said web from yarns of a plurality of distinct colors.

13. The method of claim 2 in which the back of the foundation web is colored by printing a colored pattern thereon.

References Cited in the file of this patent

UNITED STATES PATENTS

| | | |
|---|---|---|
| 2,029,768 | Ferguson et al. | Feb. 4, 1936 |
| 2,110,866 | Castles | Mar. 15, 1938 |
| 2,121,909 | Fonda | June 28, 1938 |
| 2,319,073 | McElhaney | May 11, 1943 |
| 2,348,230 | Spielmann | May 9, 1944 |
| 2,373,194 | Luttge | Apr. 10, 1945 |
| 2,373,195 | Wedler | Apr. 10, 1945 |
| 2,607,655 | Weiss et al. | Aug. 19, 1952 |
| 2,699,593 | Matthews | Jan. 18, 1955 |
| 2,700,205 | Rice | Jan. 25, 1955 |
| 2,705,880 | Kinzinger et al. | Apr. 12, 1955 |
| 2,815,558 | Bartovics et al. | Dec. 10, 1957 |
| 2,875,504 | White | Mar. 3, 1959 |

FOREIGN PATENTS

| | | |
|---|---|---|
| 644,804 | Great Britain | Oct. 18, 1950 |
| 761,075 | Great Britain | Nov. 7, 1956 |

UNITED STATES PATENT OFFICE
CERTIFICATE OF CORRECTION

Patent No. 2,988,800                                    June 20, 1961

William L. White

It is hereby certified that error appears in the above numbered patent requiring correction and that the said Letters Patent should read as corrected below.

Column 3, line 41, for "ornamental" read -- ornamented --; column 4, line 23, for "convention" read -- convection --.

Signed and sealed this 14th day of November 1961.

(SEAL)
Attest:

ERNEST W. SWIDER                                        DAVID L. LADD
Attesting Officer                                          Commissioner of Patents
                                                                              USCOMM-DC